United States Patent
Liu et al.

(10) Patent No.: US 11,437,812 B2
(45) Date of Patent: Sep. 6, 2022

(54) METHOD AND DEVICE FOR CONTROLLING DISTRIBUTED DIRECT CURRENT POWER SUPPLY SYSTEM

(71) Applicants: China Mobile Group Design Institute Co., Ltd., Beijing (CN); China Mobile Communications Group Co., Ltd., Beijing (CN)

(72) Inventors: Baochang Liu, Beijing (CN); Qiang Liu, Beijing (CN); Yusheng Li, Beijing (CN); Qifan Wang, Beijing (CN); Yongqiang Luo, Beijing (CN); Guanjun Han, Beijing (CN)

(73) Assignees: China Mobile Group Design Institute Co., Ltd., Beijing (CN); China Mobile Communications Group Co., Ltd., Beijing (CN)

( * ) Notice: Subject to any disclaimer, the term of this patent is extended or adjusted under 35 U.S.C. 154(b) by 0 days.

(21) Appl. No.: 17/059,518

(22) PCT Filed: May 21, 2019

(86) PCT No.: PCT/CN2019/087789
§ 371 (c)(1),
(2) Date: Nov. 30, 2020

(87) PCT Pub. No.: WO2019/228226
PCT Pub. Date: Dec. 5, 2019

(65) Prior Publication Data
US 2021/0210956 A1 Jul. 8, 2021

(30) Foreign Application Priority Data
May 28, 2018 (CN) .......................... 201810522961.7

(51) Int. Cl.
*H02J 1/10* (2006.01)
*H02J 9/06* (2006.01)

(52) U.S. Cl.
CPC .............. *H02J 1/102* (2013.01); *H02J 9/061* (2013.01)

(58) Field of Classification Search
CPC ................................. H02J 1/102; H02J 9/061
(Continued)

(56) References Cited

U.S. PATENT DOCUMENTS

| 5,977,750 | A | 11/1999 | Ng et al. |
| 7,379,305 | B2 * | 5/2008 | Briggs .................... G06F 1/181 361/727 |

(Continued)

FOREIGN PATENT DOCUMENTS

| CN | 102122833 A | 7/2011 |
| CN | 103050987 A | 4/2013 |

(Continued)

OTHER PUBLICATIONS

"Research on Selection of Battery Packs for UPS Power System in Data Center", www.eage.com.cn, Nov. 2017, Engineering Design.
(Continued)

*Primary Examiner* — Michael R. Fin
(74) *Attorney, Agent, or Firm* — Price Heneveld LLP

(57) ABSTRACT

A method and device for controlling a distributed direct current power supply system are provided in embodiments of this disclosure. The method includes: acquiring a direct current busbar current of the distributed direct current power supply system; acquiring, according to the direct current busbar current and a rated capacity of a power conversion unit in the distributed direct current power supply system, a quantity of power conversion units that meets a power requirement of a load; and adjusting, according to the
(Continued)

quantity of power conversion units, power conversion units that are turned on in the distributed direct current power supply system. The device is used to implement the method.

13 Claims, 4 Drawing Sheets

(58) Field of Classification Search
USPC .............................................. 307/82, 64, 66
See application file for complete search history.

(56) References Cited

U.S. PATENT DOCUMENTS

| | | | |
|---|---|---|---|
| 10,348,124 B1* | 7/2019 | MacGregor | ............... G06F 1/28 |
| 2013/0193761 A1* | 8/2013 | Colombi | ................. H02J 9/062 |
| | | | 307/64 |
| 2017/0265325 A1 | 9/2017 | Klikic et al. | |
| 2018/0116070 A1* | 4/2018 | Broadbent | ................ H02J 4/00 |
| 2019/0280520 A1* | 9/2019 | Zhang | ..................... H02J 9/062 |

FOREIGN PATENT DOCUMENTS

| | | |
|---|---|---|
| CN | 103117596 A | 5/2013 |
| CN | 105429161 A | 3/2016 |
| CN | 109245085 A | 1/2019 |
| EP | 3136531 A1 | 1/2015 |
| WO | 2014026840 A2 | 2/2014 |

OTHER PUBLICATIONS

Yusheng, "On the Configure Calculation of Base Station DC Power Supply System Capacity", China Mobile Group Design Institute Co., Ltd., Beijing, China.

* cited by examiner

METHOD AND DEVICE FOR CONTROLLING DISTRIBUTED DIRECT CURRENT POWER SUPPLY SYSTEM

CROSS-REFERENCE TO RELATED APPLICATION

This application is a U.S. national phase application of a PCT Application No. PCT/CN2019/087789 filed on May 21, 2019, which claims a priority to Chinese Patent Application No. 201810522961.7 filed in China on May 28, 2018, disclosure of which are incorporated in their entireties by reference herein.

TECHNICAL FIELD

Embodiments of the present disclosure relate to the field of power supply technologies, in particular to a method and a device for controlling a distributed direct current power supply system.

BACKGROUND

In the related art, an uninterruptible power supply system is usually used for supplying electrical power to an information communications technology (ICT) device.

In the related art, the uninterruptible power supply system mainly adopts a centralized power supply architecture. The quantities of uninterruptible power supply devices and battery packs included in the uninterruptible power supply system are relatively fixed. Uninterruptible power supply systems for different ICT devices are independent of each other. After the uninterruptible power supply system reaches a configured maximum capacity, if a rated capacity needs to be increased, it is usually necessary to increase the quantity of the uninterruptible power supply devices and the battery packs, which requires additional spaces and costs. In addition, in a case that a fault occurs in the uninterruptible power supply system, e.g., a battery pack fails, the power supply of the ICT device may be impacted, and the reliability of the uninterruptible power supply system is undermined.

Therefore, how to achieve energy control among different uninterruptible power supply systems by introducing a control method so as to cut the cost of the uninterruptible power supply system has become an important problem to be solved in the industry.

SUMMARY

In view of the problem in the related art, a method and a device for controlling a distributed direct current power supply system are provided in embodiments of the present disclosure.

In one aspect, a method for controlling a distributed direct current power supply system is provided in an embodiment of the present disclosure. The method for controlling the distributed direct current power supply system includes: acquiring a direct current busbar current of the distributed direct current power supply system; acquiring, according to the direct current busbar current and a rated capacity of a power conversion unit in the distributed direct current power supply system, a quantity of power conversion units that meets a power requirement of a load; and adjusting, according to the quantity of power conversion units, power conversion units that are turned on in the distributed direct current power supply system.

In another aspect, a device for controlling a distributed direct current power supply system is provided in an embodiment of the present disclosure. The device for controlling the distributed direct current power supply system includes: a first acquisition unit, configured to acquire a direct current busbar current of the distributed direct current power supply system; a second acquisition unit, configured to acquire, according to the direct current busbar current and a rated capacity of a power conversion unit in the distributed direct current power supply system, a quantity of power conversion units that meets a power requirement of a load; and an adjusting unit, configured to adjust, according to the quantity of power conversion units, power conversion units that are turned on in the distributed direct current power supply system.

In yet another aspect, an electronic device is provided in an embodiment of the present disclosure. The electronic device includes: a processor, a memory and a communication bus, wherein the processor and the memory communicate with each other via the communication bus, the memory stores program instructions executable by the processor, and the processor is configured to call the program instructions to implement the method for controlling the distributed direct current power supply system provided in the above embodiment.

In still another aspect, a non-transitory computer-readable storage medium storing computer instructions is provided in an embodiment of the present disclosure. The computer instructions are configured to cause a computer to implement the method for controlling the distributed direct current power supply system provided in the above embodiment.

In the method and device for controlling the distributed direct current power supply system in the embodiments of the present disclosure, a direct current busbar current of the distributed direct current power supply system is acquired; the quantity of power conversion units that meets a power requirement of a load is acquired according to the direct current busbar current and a rated capacity of a power conversion unit in the distributed direct current power supply system; and power conversion units that are turned on in the distributed direct current power supply system are adjusted according to the quantity of power conversion units, thereby the cost of an uninterruptible power supply system is saved.

BRIEF DESCRIPTION OF THE DRAWINGS

In order to illustrate the technical solutions of the embodiments of the present disclosure or of the related art in a clearer manner, the drawings required for the description of the embodiments or the related art will be described hereinafter briefly. Obviously, the following drawings merely relate to some embodiments of the present disclosure, and based on these drawings, a person of ordinary skill in the art may obtain other drawings without any creative effort.

DETAILED DESCRIPTION

In order to make the objects, the technical solutions and the advantages of the present disclosure more apparent, the present disclosure will be described hereinafter in a clear manner with reference to the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Figure 1:
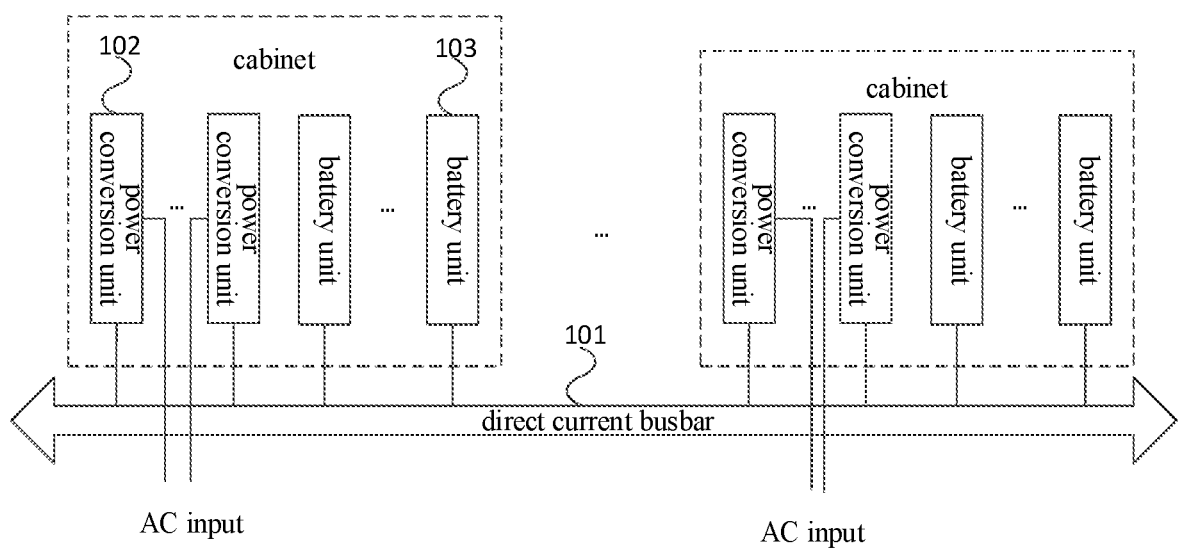
FIG. 1 is a schematic structural diagram of a distributed direct current power supply system according to an embodiment of the disclosure.

FIG. 1 is a schematic structural diagram of a distributed direct current power supply system according to an embodiment of the disclosure. As shown in FIG. 1, the distributed direct current power supply system includes a plurality of power conversion units 102, a plurality of battery units 103, a plurality of power distribution units (PDUs) and a direct current busbar 101. All the power conversion units 102 and all the battery units 103 are connected in parallel to the direct current busbar 101. The direct current busbar 101 is connected to all the PDUs, and supplies power to loads through the PDUs. For example, the load is an information communications technology (ICT) device. The power conversion units 102, the battery units 103 and the PDUs are arranged in multiple cabinets respectively, and the respective quantities of the power conversion units, the battery units and the PDUs provided in each cabinet are determined according to the load arranged in the cabinet. Based on the above-mentioned distributed direct current power supply system, a method for controlling the distributed direct current power supply system is proposed in embodiments of the present disclosure, so as to enable a unified energy scheduling and usage among different cabinets.

Figure 2:
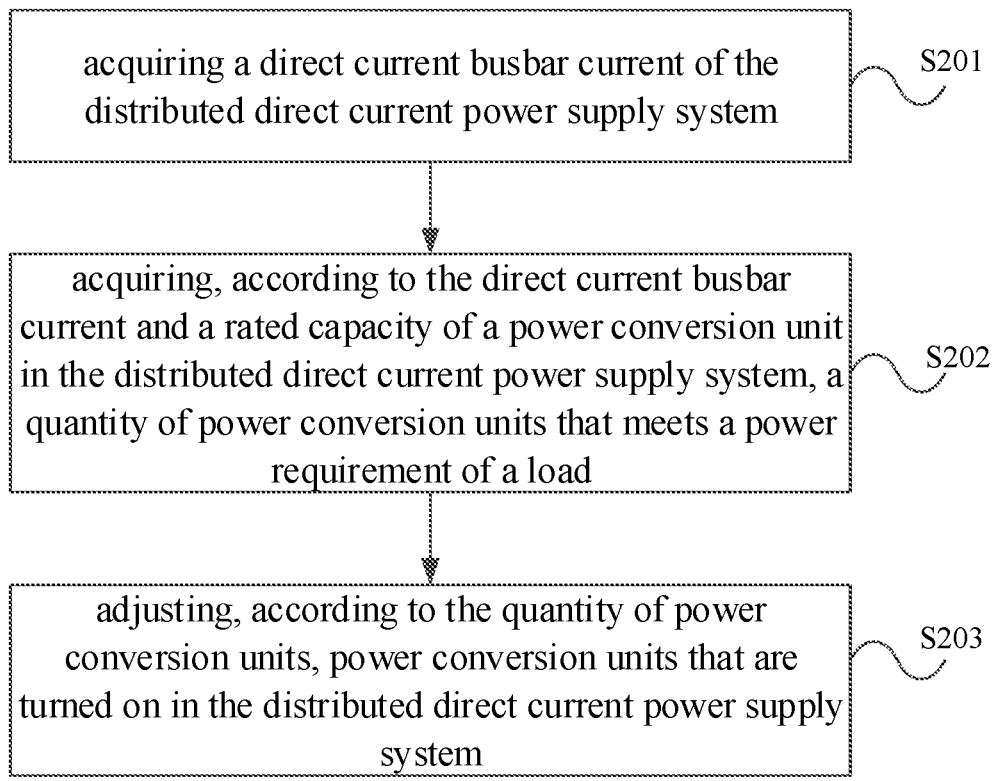
FIG. 2 is a flow chart illustrating a method for controlling the distributed direct current power supply system according to an embodiment of the present disclosure.

FIG. 2 is a flow chart illustrating a method for controlling the distributed direct current power supply system according to an embodiment of the present disclosure. As shown in FIG. 2, the method for controlling the distributed direct current power supply system according to an embodiment of the present disclosure includes S201, S202 and S203.

S201, acquiring a direct current busbar current of the distributed direct current power supply system.

Specifically, in a case that power is normally supplied by an external power source and the distributed direct current power supply system starts to supply power to a load, all the power conversion units will be turned on, and a device for controlling the distributed direct current power supply system (hereinafter referred to as a control device) may acquire the direct current busbar current through a current transformer installed on the direct current busbar.

S202, acquiring, according to the direct current busbar current and a rated capacity of a power conversion unit in the distributed direct current power supply system, a quantity of power conversion units that meets a power requirement of a load.

Specifically, after acquiring the direct current busbar current, the control device may acquire, according to the direct current busbar current and the rated capacity of the power conversion unit, a quantity of power conversion units to be turned on in order that a power requirement of the load is met. The rated capacity of the power conversion unit is preset.

For example, after acquiring the direct current busbar current I, the control device may calculate according to a formula $N=I/(A \times Y)$ to acquire the quantity N of power conversion units that meets the power requirement of the load, wherein A represents a rated capacity of the power conversion unit, Y represents an optimal efficiency controlled load rate of the power conversion unit, and A and Y are preset.

S203, adjusting, according to the quantity of power conversion units, power conversion units that are turned on in the distributed direct current power supply system.

Specifically, after acquiring the quantity of power conversion units that meets the power requirement of the load, the control device compares the quantity $Q_1$ of power conversion units that meets the power requirement of the load with a quantity $Q_2$ of power conversion units that have been turned on, and turns off a quantity, which is a difference between $Q_2$ and $Q_1$, of power conversion units, with the quantity $Q_1$ of power conversion units remaining at work. The to-be-turned-off power conversion units are determined empirically, which is not limited in embodiments of the present disclosure.

For example, the distributed direct current power supply system includes 100 power conversion units distributed in multiple cabinets, and when the distributed direct current power supply system is started, the 100 power conversion units are all turned on. Assuming that the control device acquires 60 as the quantity of power conversion units that meets the power requirement of the load, the control device learns, by comparing the quantity of the power conversion units that have been turned on, which is 100, with the quantity of required power conversion units, which is 60, that 40 units of the power conversion units need to be turned off. The control device may randomly select 40 power conversion units from the 100 power conversion units, and turn off the selected 40 power conversion units.

In the method for controlling the distributed direct current power supply system according to the embodiment of the present disclosure, a direct current busbar current of the distributed direct current power supply system is acquired; the quantity of power conversion units that meets a power requirement of a load is acquired according to the direct current busbar current and a rated capacity of a power conversion unit in the distributed direct current power supply system; and power conversion units that are turned on in the distributed direct current power supply system are adjusted according to the quantity of power conversion units, so that the system operates at a load rate with optimal efficiency.

Figure 3:
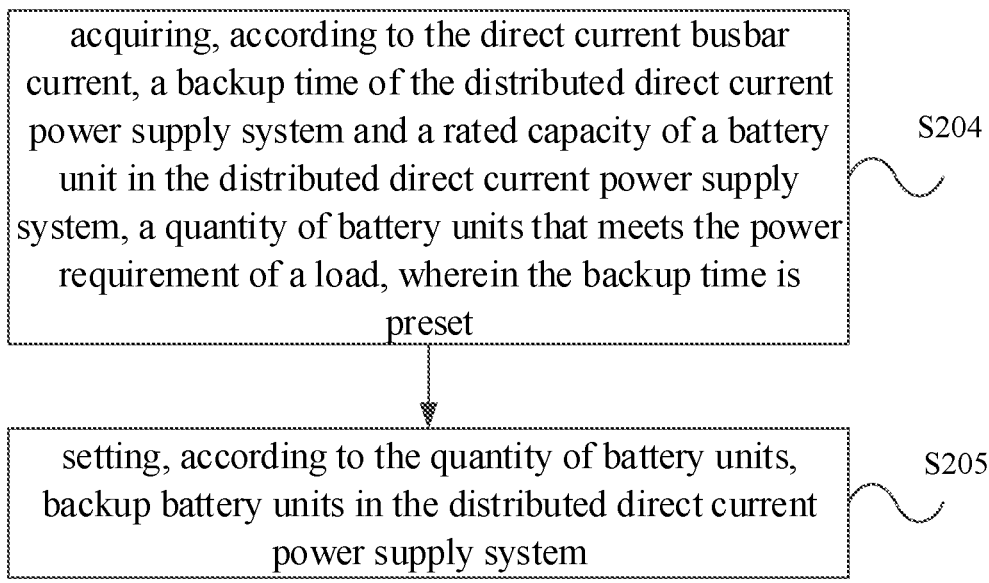
FIG. 3 is a flow chart illustrating a method for controlling the distributed direct current power supply system according to another embodiment of the present disclosure.

FIG. 3 is a flow chart illustrating a method for controlling the distributed direct current power supply system according to another embodiment of the present disclosure. The method for controlling the distributed direct current power supply system according to the embodiment of the present disclosure further includes S204 and S205.

S204, acquiring, according to the direct current busbar current, a backup time of the distributed direct current power supply system and a rated capacity of a battery unit in the distributed direct current power supply system, a quantity of battery units that meets the power requirement of a load, wherein the backup time is preset.

Specifically, the backup time of the distributed direct current power supply system is a time duration for which a normal operation of the load can be sustained by certain quantity of battery units in case that an external power source is cut off. Based on the direct current busbar current, the backup time, and the rated capacity of the battery unit, the control device may acquire a quantity of battery units required to meet the power requirement of the load. The backup time and the rated capacity of the battery unit are preset.

For example, after acquiring the direct current busbar current I, the backup time T of the distributed direct current power supply system and the rated capacity B of the battery unit, the control device may calculate according to a formula $M=K \times I \times T/(B \times K \times \eta)$ to acquire the quantity M of battery units that meets the power requirement of the load, wherein K represents a safety coefficient of the battery unit, and $\eta$ represents a discharge coefficient of the battery unit. K and $\eta$ are set empirically, which are not limited in embodiments of the present disclosure. B and T are preset.

S205, setting, according to the quantity of battery units, backup battery units in the distributed direct current power supply system.

Specifically, after acquiring the quantity of battery units that meets the power requirement of the load, the control device allocates a corresponding quantity of battery units to the load, and ensures that the corresponding quantity of the battery units are fully charged, such that the corresponding quantity of battery units may sustain the operation of the load for the backup time in case that the external power supply is off. The corresponding quantity of battery units may come from different cabinets.

On the basis of the foregoing embodiments, further, the acquiring, according to the direct current busbar current, the backup time of the distributed direct current power supply system and the rated capacity of the battery unit in the distributed direct current power supply system, the quantity of battery units that meets the power requirement of the load includes: calculating according to the formula $M=K \times I \times T/(B \times K \times \eta)$ to acquire the quantity M of battery units that meets the power requirement of the load, wherein K represents a safety coefficient of the battery unit, I represents the direct current busbar current, T represents the backup time of the distributed direct current power supply system, B represents the rated capacity of the battery unit, and $\eta$ represents a discharge coefficient of the battery unit.

Specifically, after acquiring the direct current busbar current I, the control device may calculate according to the formula $M=K \times I \times T/(B \times K \times \eta)$ to acquire the quantity M of battery units that meets the power requirement of the load, wherein K represents a safety coefficient of the battery unit, T represents the backup time of the distributed direct current power supply system, B represents the rated capacity of the battery unit, and $\eta$ represents a discharge coefficient of the battery unit. K and $\eta$ are set empirically, which are not limited in embodiments of the present disclosure.

Figure 4:
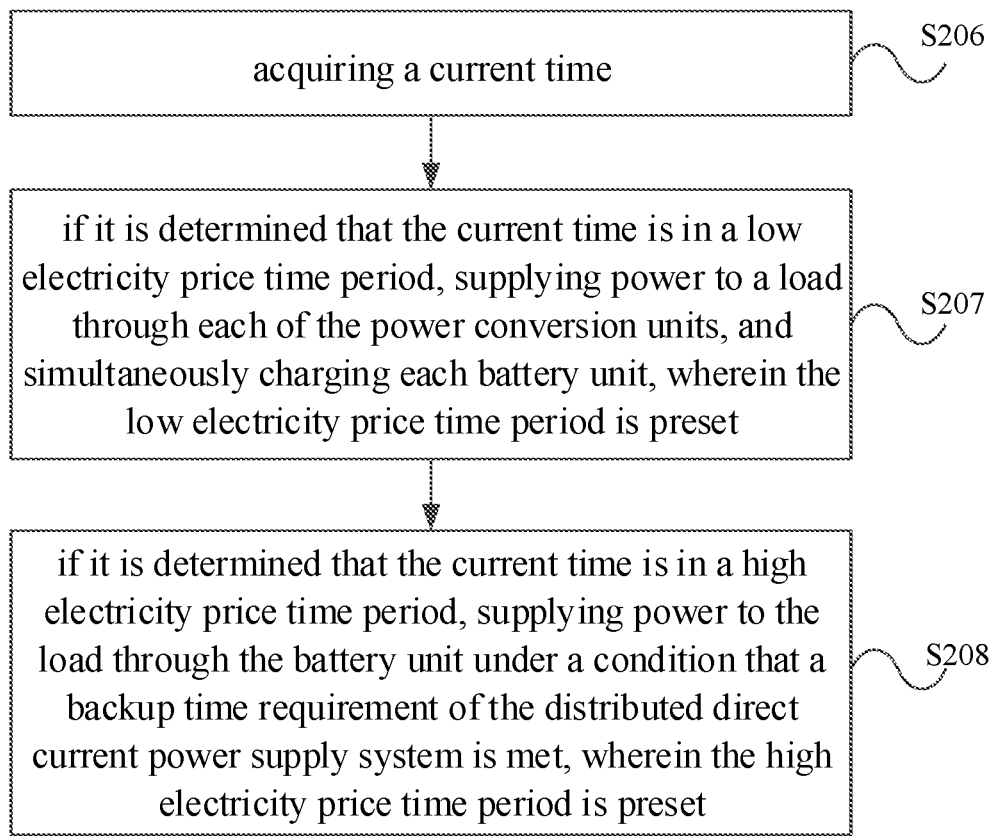
FIG. 4 is a flow chart illustrating a method for controlling the distributed direct current power supply system according to yet another embodiment of the present disclosure.

FIG. 4 is a flow chart illustrating a method for controlling the distributed direct current power supply system according to yet another embodiment of the present disclosure. As shown in FIG. 4, the method for controlling the distributed direct current power supply system according to the embodiment of the present disclosure further includes S206, S207 and S208.

S206, acquiring a current time.

S207, if it is determined that the current time is in a low electricity price time period, supplying power to a load through each of the power conversion units, and simultaneously charging each battery unit, wherein the low electricity price time period is preset.

Specifically, the control device compares the current time with a start time and an end time of the low electricity price time period respectively, and if the current time is between the start time and the end time of the low electricity price time period, then the current time is in the low electricity price time period. The control device controls each of the power conversion units to supply power to the load, and controls power conversion units matching with the battery units in quantity to charge each of the battery units, so as to realize that the battery units store energy when electricity price is low. The low electricity price time period is preset. It should be appreciated that, a fully charged battery unit is no longer charged.

S208, if it is determined that the current time is in a high electricity price time period, supplying power to the load through the battery unit under a condition that a backup time requirement of the distributed direct current power supply system is met, wherein the high electricity price time period is preset.

Specifically, the control device compares the current time with a start time and an end time of the high electricity price time period respectively, and if the current time is between the start time and the end time of the high electricity price time period, then the current time is in the high electricity price time period. The control device may reserve certain quantity of the battery units to meet the backup time requirement of the distributed direct current power supply system, control each of the power conversion units to reduce an output voltage, and supply power to the load by using the remaining battery units, thereby saving electricity cost. The high electricity price time period is preset.

On the basis of the foregoing embodiments, further, the acquiring, according to the direct current busbar current and the rated capacity of the power conversion unit in the distributed direct current power supply system, the quantity of power conversion units that meets the power requirement of the load includes: calculating according to the formula $N=I/(A \times Y)$ to acquire a quantity N of power conversion units that meets the power requirement of the load, wherein I represents the direct current busbar current, A represents the rated capacity of the power conversion unit, and Y represents an optimal efficiency controlled load rate of the power conversion unit.

Specifically, after acquiring the direct current busbar current I, the control device may calculate according to the formula $N=I/(A \times Y)$ to acquire the quantity N of power conversion units that meets the power requirement of the load, wherein A represents the rated capacity of the power conversion unit, Y represents an optimal efficiency controlled load rate of the power conversion unit, and A and Y are preset.

On the basis of the foregoing embodiments, further, a method for controlling the distributed direct current power supply system according to an embodiment of the present disclosure further includes: in a case that a redundantly allocated quantity of power conversion units corresponding to the load is changed, adjusting power conversion units corresponding to the load according to the changed redundantly allocated quantity.

Specifically, the control device may search according to an identifier of the load to acquire a redundantly allocated quantity of power conversion units corresponding to the load. In a case that a redundantly allocated quantity of power conversion units corresponding to the load is changed, the control device may adjust power conversion units corresponding to the load according to the changed redundantly allocated quantity. That is, in a case that the redundantly allocated quantity is increased, the quantity of power conversion units allocated by the control device to the load is increased by a corresponding quantity; in a case that the redundantly allocated quantity is decreased, the quantity of power conversion units allocated by the control device to the load is decreased by a corresponding quantity.

For example, if a redundantly allocated quantity of power conversion units corresponding to the load A is changed from 1 to 5, then the quantity of power conversion units allocated by the control device to the load A is increased by 4 on the basis of an original quantity.

On the basis of the foregoing embodiments, further, the adjusting power conversion units corresponding to the load according to the changed redundantly allocated quantity includes: in a case that the changed redundantly allocated quantity is increased and a cabinet where the load is located does not have enough idle power conversion units, allocating an idle power conversion unit arranged in other cabinet to the load.

Specifically, in a case that a redundantly allocated quantity of power conversion units corresponding to the load is increased, and the cabinet where the load is located does not have enough idle power conversion units to be allocated to the load, the control device may requisition an idle power conversion unit from other cabinet and allocate it to the load, to meet the redundant allocation of power conversion units corresponding to the load.

For example, a redundantly allocated quantity of power conversion units corresponding to the load A is changed from 1 to 5, then the quantity of power conversion units allocated by the control device to the load A needs to be increased by 4 on the basis of an original quantity, but a cabinet a where the load A is located only has one idle power conversion unit, and three more power conversion units are needed. The control device learns that there are three idle power conversion units in a cabinet b, and the control device may allocate the one idle power conversion unit in the cabinet a and the three idle power conversion units in the cabinet b to the load A, as a redundant allocation of power conversion unit for the load A.

Figure 5:
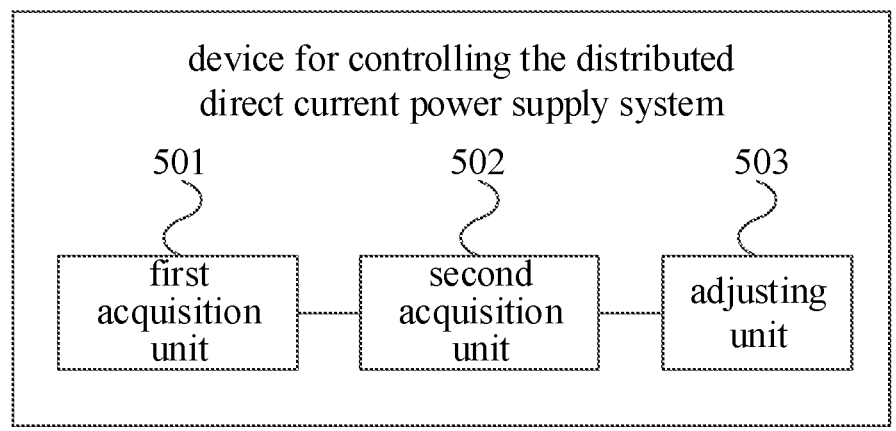
FIG. 5 is a schematic structural diagram of a device for controlling the distributed direct current power supply system according to an embodiment of the disclosure.

FIG. 5 is a schematic structural diagram of a device for controlling the distributed direct current power supply system according to an embodiment of the disclosure. As shown in FIG. 5, the device for controlling the distributed direct current power supply system according to the embodiment of the disclosure includes a first acquisition unit 501, a second acquisition unit 502 and an adjusting unit 503.

The first acquisition unit 501 is configured to acquire a direct current busbar current of the distributed direct current power supply system; the second acquisition unit 502 is configured to acquire, according to the direct current busbar current and a rated capacity of a power conversion unit in the distributed direct current power supply system, a quantity of power conversion units that meets a power requirement of a load; and the adjusting unit 503 is configured to adjust, according to the quantity of power conversion units, power conversion units that are turned on in the distributed direct current power supply system.

Specifically, when power is normally supplied by an external power source and the distributed direct current power supply system starts to supply power to a load, all the power conversion units will be turned on, and the first acquisition unit 501 may acquire the direct current busbar current through a current transformer installed on the direct current bus.

After acquiring the direct current busbar current, the second acquisition unit 502 may acquire, according to the direct current busbar current and the rated capacity of the power conversion unit, the quantity of power conversion units that need to be turned on under a condition that the power requirement of the load is met. The rated capacity of the power conversion unit is preset.

After acquiring the quantity of power conversion units that meets the power requirement of the load, the adjusting unit 503 compares the quantity $Q_1$ of power conversion units that meets the power requirement of the load with the quantity $Q_2$ of power conversion units that have been turned on, and turns off a quantity, which is a difference between $Q_2$ and $Q_1$, of power conversion units, with the quantity $Q_1$ of power conversion units remaining at work. The to-be-turned-off power conversion units are determined empirically, which is not limited in embodiments of the present disclosure.

In the device for controlling the distributed direct current power supply system according to the embodiment of the present disclosure, a direct current busbar current of the distributed direct current power supply system is acquired; the quantity of power conversion units that meets a power requirement of a load is acquired according to the direct current busbar current and a rated capacity of a power conversion unit in the distributed direct current power supply system; and power conversion units that are turned on in the distributed direct current power supply system are adjusted according to the quantity of power conversion units, so that the system operates at a load rate with optimal efficiency.

The device in the embodiments of the present disclosure may be specifically used to implement processing procedures of the above-mentioned method embodiments, its functions will not be described again herein, and a reference may be made to detailed description of the above-mentioned method embodiments.

Figure 6:
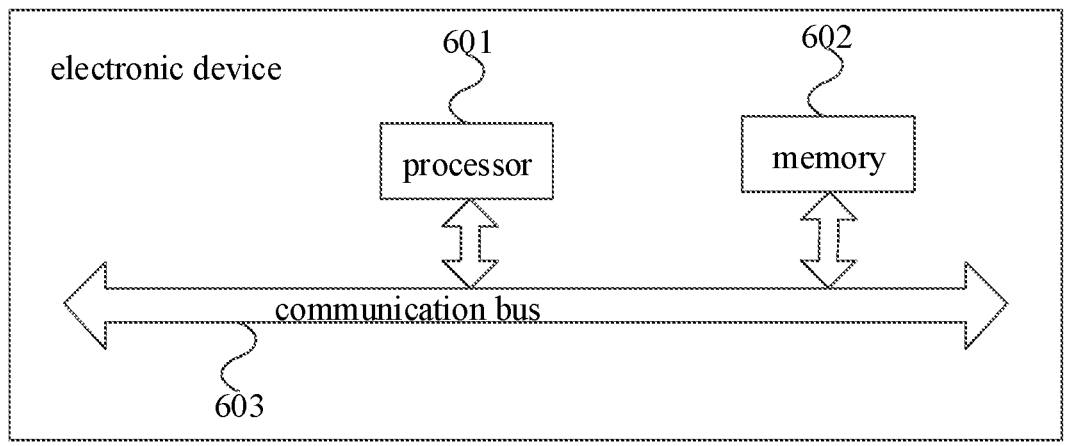
FIG. 6 is a schematic structural diagram of entities of an electronic device according to an embodiment of the disclosure.

FIG. 6 is a schematic structural diagram of entities of an electronic device according to an embodiment of the present disclosure. As shown in FIG. 6, the electronic device includes a processor 601, a memory 602 and a communication bus 603. The processor 601 and the memory 602 communicate with each other via the communication bus 603. The processor 601 is configured to call program instructions in the memory 602 to implement the method in the foregoing method embodiments, for example, the method includes: acquiring a direct current busbar current of the distributed direct current power supply system; acquiring, according to the direct current busbar current and a rated capacity of a power conversion unit in the distributed direct current power supply system, a quantity of power conversion units that meets a power requirement of a load; and adjusting, according to the quantity of power conversion units, power conversion units that are turned on in the distributed direct current power supply system.

A computer program product is provided in an embodiment of the present disclosure. The computer program product includes a computer program stored on a non-transitory computer-readable storage medium. The computer program includes program instructions. When the program instructions are executed by a computer, the computer may perform the method in the foregoing method embodiments, for example, the method includes: acquiring a direct current busbar current of the distributed direct current power supply system; acquiring, according to the direct current busbar current and a rated capacity of a power conversion unit in the distributed direct current power supply system, a quantity of power conversion units that meets a power requirement of a load; and adjusting, according to the quantity of power conversion units, power conversion units that are turned on in the distributed direct current power supply system.

A non-transitory computer-readable storage medium is provided in an embodiment of the present disclosure. The non-transitory computer-readable storage medium stores computer instructions. The computer instructions are configured to cause a computer to implement the method in the foregoing method embodiments, for example, the method includes: acquiring a direct current busbar current of the distributed direct current power supply system; acquiring, according to the direct current busbar current and a rated capacity of a power conversion unit in the distributed direct current power supply system, a quantity of power conversion units that meets a power requirement of a load; and adjusting, according to the quantity of power conversion units, power conversion units that are turned on in the distributed direct current power supply system.

Further, in a case that the logic instructions in the memory may be implemented in the form of software functional units and sold or used as an independent product, they may also be stored in a computer readable storage medium. Based upon such understanding, essential parts, or parts contributing to the related art, of the technical solution of the embodiments of the present disclosure may be implemented in form of a software product. The computer software product is stored in a storage medium and includes several instructions configured to be executed by a computer device (which may be a personal computer, a device or a network device) to perform all or some steps of the method according to the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

The device described above are merely illustrative. The units described as separate components may or may not be physically separated, and the components shown as units may or may not be physical units, that is, may be located in one place, or may be distributed on multiple network units. Some or all of the units may be selected based on actual needs to achieve the purpose of the solution of the embodiment, and may be understood and implemented by a person of ordinary skill in the art without any creative effort.

From the exemplary embodiments described above, a person skilled in the art may clearly understand that each embodiment may be implemented by using software with necessary universal hardware platform, and of course, it may also be implemented by hardware. Based on such understanding, essential parts, or parts contributing to the related art, of the technical solution of the embodiments of the present disclosure may be implemented in form of a software product. The computer software product may be stored in a computer-readable storage media, e.g., a ROM/RAM, a magnetic disk, or an optical disc. The computer software product includes several instructions configured to be executed by a computer device (which may be a personal computer, a server or a networked device, etc.) to implement the method described in the embodiments or some parts of the embodiments.

Finally, it should be appreciated that, the above embodiments are only used to illustrate the technical solutions of the embodiments of the present disclosure, but shall not be construed as limiting the present disclosure. Although the embodiments of the present disclosure are described in detail with reference to the foregoing embodiments, it should be appreciated by a person of ordinary skill in the art that: modification may be made to the technical solutions described in the foregoing embodiments, or equivalent replacements may be made to some of the technical features. These modifications or replacements do not make the essence of corresponding technical solutions depart from the spirit and scope of the technical solutions of the embodiments of the present disclosure.

What is claimed is:

1. A method for controlling a distributed direct current power supply system, comprising:
   acquiring a direct current busbar current of the distributed direct current power supply system;
   acquiring, according to the direct current busbar current and a rated capacity of a power conversion unit in the distributed direct current power supply system, a quantity of power conversion units that meets a power requirement of a load; and
   adjusting, according to the quantity of power conversion units, power conversion units that are turned on in the distributed direct current power supply system;
   wherein the method further comprises:
   acquiring, according to the direct current busbar current, a backup time of the distributed direct current power supply system and a rated capacity of a battery unit in the distributed direct current power supply system, a quantity of battery units that meets the power requirement of the load; wherein, the backup time is preset; and
   setting, according to the quantity of battery units, backup battery units in the distributed direct current power supply system;
   wherein the acquiring, according to the direct current busbar current, the backup time of the distributed direct current power supply system and the rated capacity of the battery unit in the distributed direct current power supply system, the quantity of battery units that meets the power requirement of the load comprises:
   calculating according to a formula $M=K \times I \times T/(B \times K \times \eta)$ to acquire the quantity M of battery units that meets the power requirement of the load, wherein K represents a safety coefficient of the battery unit, I represents the direct current bulbar current, T represents the backup time of the distributed direct current power supply system, B represents the rated capacity of the battery unit, and $\eta$ represents a discharge coefficient of the battery unit.

2. The method according to claim 1, further comprising:
   adjusting the power conversion units corresponding to the load according to a changed redundantly allocated quantity of power conversion units corresponding to the load.

3. The method according to claim 2, wherein the adjusting the power conversion units corresponding to the load according to the changed redundantly allocated quantity of power conversion units corresponding to the load comprises:
   determining that the changed redundantly allocated quantity is increased and a cabinet where the load is located does not have enough idle power conversion units;
   allocating an idle power conversion unit arranged in other cabinet to the load.

4. The method according to claim 1, further comprising:
   acquiring a current time;
   determining that the current time is in a low electricity price time period;

supplying power to the load through each of the power conversion units, and simultaneously charging each battery unit; wherein the low electricity price time period is preset.

5. The method according to claim 1, wherein the acquiring, according to the direct current bulbar current and the rated capacity of the power conversion unit in the distributed direct current power supply system, the quantity of power conversion units that meets the power requirement of the load comprises:

calculating according to a formula $N=I/(A\times Y)$ to acquire the quantity N of power conversion units that meets the power requirement of the load, wherein I represents the direct current busbar current, A represents the rated capacity of the power conversion unit, and Y represents an optimal efficiency controlled load rate of the power conversion unit.

6. A non-transitory computer-readable storage medium storing computer instructions, wherein the computer instructions are configured to cause a computer to implement the method according to claim 1.

7. The method according to claim 1, further comprising:
acquiring a current time;
determining that the current time is in a high electricity price time period;
supplying power to the load through the battery units based on a backup time requirement of the distributed direct current power supply system; wherein the high electricity price time period is preset.

8. An electronic device, comprising: a processor, a memory and a communication bus, wherein,
the processor and the memory communicate with each other via the communication bus; the memory stores program instructions executable by the processor, and the processor is configured to call the program instructions to implement a method for controlling a distributed direct current power supply system, and the method comprises:
acquiring a direct current busbar current of the distributed direct current power supply system;
acquiring, according to the direct current busbar current and a rated capacity of a power conversion unit in the distributed direct current power supply system, a quantity of power conversion units that meets a power requirement of a load; and
adjusting, according to the quantity of power conversion units, power conversion units that are turned on in the distributed direct current power supply system;
wherein the method further comprises:
acquiring, according to the direct current busbar current, a backup time of the distributed direct current power supply system and a rated capacity of a battery unit in the distributed direct current power supply system, a quantity of battery units that meets the power requirement of the load; wherein, the backup time is preset; and
setting, according to the quantity of battery units, backup battery units in the distributed direct current power supply system;
wherein the acquiring, according to the direct current busbar current, the backup time of the distributed direct current power supply system and the rated capacity of the battery unit in the distributed direct current power supply system, the quantity of battery units that meets the power requirement of the load comprises:

calculating according to a formula $M=K\times I\times T/(B\times K\times \eta)$ to acquire the quantity M of battery units that meets the power requirement of the load, wherein K represents a safety coefficient of the battery unit, I represents the direct current busbar current, T represents the backup time of the distributed direct current power supply system, B represents the rated capacity of the battery unit, and n represents a discharge coefficient of the battery unit.

9. The electronic device according to claim 8, wherein the method further comprises:
adjusting the power conversion units corresponding to the load according to a changed redundantly allocated quantity of power conversion units corresponding to the load.

10. The electronic device according to claim 9, wherein the adjusting the power conversion units corresponding to the load according to the changed redundantly allocated quantity of power conversion units corresponding to the load comprises:
determining that the changed redundantly allocated quantity is increased and a cabinet where the load is located does not have enough idle power conversion units;
allocating an idle power conversion unit arranged in other cabinet to the load.

11. The electronic device according to claim 8, wherein the method further comprises:
acquiring a current time;
determining that the current time is in a low electricity price time period;
supplying power to the load through each of the power conversion units, and simultaneously charging each battery unit; wherein the low electricity price time period is preset.

12. The electronic device according to claim 8, wherein the acquiring, according to the direct current busbar current and the rated capacity of the power conversion unit in the distributed direct current power supply system, the quantity of power conversion units that meets the power requirement of the load comprises:
calculating according to a formula $N=I/(A\times Y)$ to acquire the quantity N of power conversion units that meets the power requirement of the load, wherein I represents the direct current busbar current, A represents the rated capacity of the power conversion unit, and Y represents an optimal efficiency controlled load rate of the power conversion unit.

13. The electronic device according to claim 8, wherein the method further comprises:
acquiring a current time;
determining that the current time is in a high electricity price time period;
supplying power to the load through the battery units based on a backup time requirement of the distributed direct current power supply system; wherein the high electricity price time period is preset.

* * * * *